Oct. 15, 1957  C. W. CALDWELL  2,809,538
ANTI-SKID PEDAL COVER
Filed May 27, 1955

INVENTOR.
Charles W. Caldwell
BY Milton Zucker

United States Patent Office 2,809,538
Patented Oct. 15, 1957

2,809,538

ANTI-SKID PEDAL COVER

Charles W. Caldwell, New York, N. Y.

Application May 27, 1955, Serial No. 511,579

5 Claims. (Cl. 74—563)

This invention relates to foot pedals for automobiles and for other machinery operated by foot pedals. It has as its principal object the provision of a simple, inexpensive, long-wearing pedal plate of such construction that slipping of the foot is effectively prevented. My new pedal plate is especially designed to be easy on the operator, while at the same time effectively guarding against slippage.

According to my invention, I achieve these results by using as a pedal plate a base of readily deformable material such as soft rubber, and preferably a sponge of rubber or deformable plastic, on which is mounted an expanded metal grid, preferably hardened to prevent rapid burnishing. On assembling the device, the metal grid pushes down into the soft base to produce a structure which is resilient when pressure is applied to it in a direction normal to its surface, but which is hard, non-yielding, and has a non-skid metal surface when an object is pulled along the surface parallel to it. I thus obtain a combination of a comfortable feel during normal operation of the device, combined with protection against slippage in any weather.

The invention can best be understood by reference to the accompanying drawings, in which Fig. 1 is a plan view of the top of the device.

Figure 1:
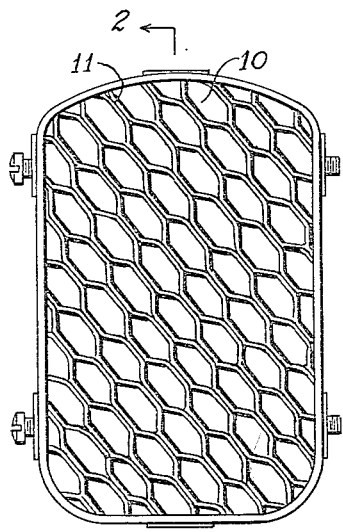
Figure 2:
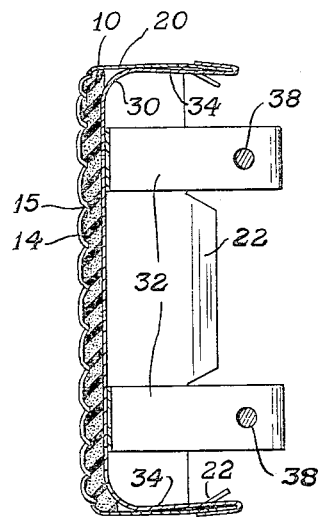
Fig. 2 is a section along the line 2—2 of Fig. 1.
Figure 3:
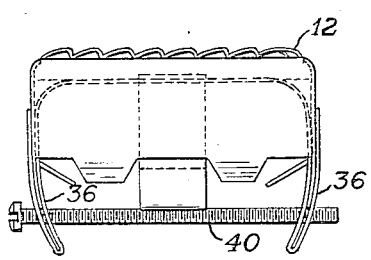
Fig. 3 is a front elevation of the device.

My device consists essentially of a pad 10 of soft rubber or other readily deformable elastomeric material (e. g. soft plastic), preferably rendered more deformable by being of spongy nature (e. g. foam rubber). Mounted on the pad of foamed rubber is a sheet of metal mesh 12, preferably of expanded metal, with peaks 14 and valleys 15 so that it presents a corrugated surface. The metal is preferably hardened, to. insure against burnishing the metal down; it will not stamp down under pressure because of the deformable nature of the pad 10.

The pad 10 and metal sheet 12 are bound about the edges with a metallic binding 20 having lugs 22 integral therewith. The pad 10 is supported on the bottom by a skeleton frame consisting of a longitudinal piece 30 and lateral pieces 32, of thin metal. Legs 34 on the longitudinal piece are turned upward on themselves at their extremities to embrace the bottom edge of the binding 20. The side pieces also have legs 36 which are doubled up on themselves to embrace the binding. Holes 38 cut in the doubled up portion hold threaded bolts 40; the doubling of the thin metal acts to catch the threads of the bolt, so that no machining is necessary to produce threads to catch the bolt.

Figure 4:
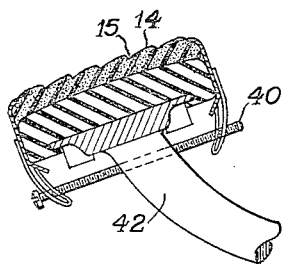
Fig. 4 is a sectional view of the device mounted on an automobile foot brake.

As will be seen in Fig. 4, the device is mounted by slipping it over a standard pedal arrangement 42; the lugs 22 are then bent around the regular brake pedal; and the bolts 40 are inserted in the holes 38, and tightened. The pressure involved in mounting pushes the foamed rubber up to the holes in the grid work, so that a foot on the mounted pedal, while it hits metal, is never far from rubber. On pressure downward, there is a cushion effect which is restful; but a wet shoe, trying to slip off the brake, hits the projections 14 in the expanded metal which act to prevent skidding. Where foam rubber is used, it has the additional advantage of absorbing up the water etc. scraped off a wet shoe, thereby reducing the tendency to skid off. Furthermore, the rubber pushed into the grid acts as a buffer to resist motion along the surface.

It is obvious that the invention is not limited to the specific form of the device shown in the drawings and described herein, and that changes can be made without departing from the scope of my invention as defined in the claims.

I claim:

1. A pedal covering comprising a base of soft, readily deformable material, a grid of rigid material having a continuous, corrugated surface mounted on the deformable material, and retaining means for holding the grid in place in opposition to forces along the grid surface whereby the pedal covering is resilient under pressure in a direction normal to its surface, but is non-yielding and anti-skidding in opposition to forces along the surface.

2. A pedal covering comprising a base of soft rubbery material, a grid of rigid material having a continuous, corrugated surface mounted on the deformable material, and retaining means for holding the grid in place in opposition to forces along the grid surface whereby the pedal covering is resilient under pressure in a direction normal to its surface, but is non-yielding and anti-skidding in opposition to forces along the surface.

3. A pedal covering comprising a base of foamed rubbery material, a grid of metal having a continuous, corrugated surface mounted on the deformable material, and retaining means for holding the grid in place in opposition to forces along the grid surface whereby the pedal covering is resilient under pressure in a direction normal to its surface, but is non-yielding and anti-skidding in opposition to forces along the surface.

4. A pedal covering comprising a base of foamed rubber, a grid of expanded metal having a continuous, corrugated surface mounted on the deformable material, and retaining means for holding the grid in place in opposition to forces along the grid surface whereby the pedal covering is resilient under pressure in a direction normal to its surface, but is non-yielding and anti-skidding in opposition to forces along the surface.

5. The pedal covering of claim 4, in which the covering is mounted on a base having deformable legs adapted to embrace a pedal, and bolt means for tightening the covering about the pedal.

References Cited in the file of this patent

UNITED STATES PATENTS

| | | |
|---|---|---|
| 1,439,065 | Burlock | Dec. 19, 1922 |
| 1,875,399 | Ritz Woller | Sept. 6, 1932 |
| 1,977,415 | Thorp | Oct. 16, 1934 |